United States Patent [19]

Kimerly

[11] Patent Number: 4,741,542
[45] Date of Patent: May 3, 1988

[54] SEALING CONSTRUCTION

[75] Inventor: John C. Kimerly, Corona, Calif.

[73] Assignee: Rockwell International Corporation, El Segundo, Calif.

[21] Appl. No.: 530,324

[22] Filed: Sep. 8, 1983

[51] Int. Cl.⁴ .................. B23P 15/00; B64C 1/14; F16J 15/46

[52] U.S. Cl. .................. 277/34; 29/460; 29/462; 29/526 R; 49/477; 244/121; 244/129.3; 244/131; 277/72 FM; 277/75; 296/84 R; 296/93

[58] Field of Search .............. 277/34, 34.3, 34.6, 277/72 FM, 207 A, 12, 75; 244/129.3, 121, 131; 49/477, 498; 29/460, 462, 526 R; 296/93, 84 R

[56] References Cited

U.S. PATENT DOCUMENTS

| | | | |
|---|---|---|---|
| 2,306,160 | 12/1942 | Freyssinet | 277/34 |
| 2,701,899 | 2/1955 | Krupp | 244/129.3 X |
| 2,801,061 | 7/1957 | Logan | 29/526 X |
| 2,808,355 | 10/1957 | Christie et al. | 244/129.3 X |
| 2,815,966 | 12/1957 | House | 277/207 A |
| 3,042,980 | 7/1962 | Brinsmade | 49/477 |
| 3,222,076 | 12/1965 | Hollingsworth | 277/34.3 |
| 3,491,825 | 1/1970 | Peterson et al. | 49/477 |
| 3,907,442 | 9/1975 | Reid | 277/72 FM |
| 4,324,373 | 4/1982 | Zibritosky | 244/121 |

Primary Examiner—Allan N. Shoap
Attorney, Agent, or Firm—Charles T. Silberberg; Max Geldin

[57] ABSTRACT

Elastomer injection dry seal construction produced by placing a tube-like flexible elastic body member having a hollow cross-section between spaced part surfaces, particularly between a curved transparency such as an aircraft windshield, and a curved support. The parts are then connected together as by means of bolts passing through aligned bolt holes in the parts, and a curable liquid resin, such as a catalyzed liquid silicone resin, is injected into the hollow interior of the tubular body member, causing it to stretch laterally in the space between the adjacent part surfaces, and to be compressed into engagement with such surfaces. The liquid resin is then cured to a solid elastomeric state. The energy stored in stretching the tube-like body member laterally and in compressing same into contact with the part surfaces, effects a seal therebetween.

13 Claims, 1 Drawing Sheet

SEALING CONSTRUCTION

BACKGROUND OF THE INVENTION

This invention relates to an improved flexible seal construction, and is particularly directed to providing an elastomer injection dry seal especially designed for use between a curved transparency such as an aircraft windshield and a supporting member, which are assembled and connected together by bolts.

In assembling curved transparencies such as a curved windshield in an aircraft, a solid or dry seal is positioned in a space between the inner surface of the windshield and the support member, and thereafter bolts are inserted in suitable bolt holes in the curved windshield and the support member and the bolts are torqued to mount the windshield in fixed position on the support member. When the bolts are turned down, the seal member is compressed to effect a seal between the curved windshield and the support member.

However, curved transparencies such as a curved aircraft windshield are very difficult to install on a supporting member due to bolt hole misalignment caused by the initial placement of the uncompressed dry seal between the curved transparency and the support member prior to insertion of the bolts.

U.S. Pat. No. 3,517,472 to Toth describes a structure comprising a hollow passage into which a catalyzed liquid resin such as polyurethane foam is injected, which expands into engagement with and actuates a locking mechanism which permanently locks the members in place.

U.S. Pat. No. 3,159,886 to Lynch discloses a sealing strip for automobile doors by injecting a foamed-in-place elastomeric resin for a certain distance within a tubular sealing member to provide a reinforcing filler.

U.S. Pat. No. 3,473,829 to Daniels discloses an inflatible connector employing a rigid foaming type resin to actuate a clamping mechanism.

It is an object of the present invention to provide a novel seal construction and method for producing same.

Another object of the invention is the provision of a seal construction particularly designed for placement between parts, such as curved transparencies, especially a curved aircraft windshield, and a supporting member, while maintaining the parts in aligned spaced relation, so as to avoid misalignment of bolt holes in the respective parts, prior to insertion of the bolts.

A further object of the invention is to provide a dry seal of the above type and a method for producing same, which embodies the ease of installation of a wet injection seal.

The above and other objects will be apparent from the following description of the invention.

SUMMARY OF THE INVENTION

The above objects and advantages are achieved according to the invention by placing a tubing-like flexible elastic body member, i.e. an essentially tubular flexible seal, having a hollow cross-section between spaced part surfaces to be sealed, for example between a curved transparency or curved windshield, and a support member for such transparency.

After placement of the hollow tubular seal component between the part surfaces, and particularly where the parts are in the form of a curved transparency or curved windshield as for an aircraft, and wherein bolt holes are provided in the curved transparency and its supporting member, the bolt holes are located so that such holes are in alignment for receiving the bolts for connecting the parts in position. After the required bolts are inserted in the bolt holes and the bolts are torqued, a curable liquid resin, e.g. a catalyzed liquid resin such as a silicone resin, is injected into the hollow interior of the seal. This causes the flexible tubular body member to stretch laterally and to be compressed into engagement with the contact areas of the parts, e.g. the spaced surfaces of a curved transparency and its supporting member.

The liquid resin in then cured to an elastomeric state under pressure. The energy stored in stretching the tube-like body of the seal, and in compressing the contact portions thereof against the adjacent part surfaces during injection and curing of the liquid resin under pressure in the hollow interior of the tubular body, maintains the pressure required to effect the seal.

The result is the production of a dry elastomeric seal which permits facile repair of the structure, e.g. the curved transparency or windshield, when necessary by removal of the bolts and disassembly of the structure, followed by replacement of the transparency with the dry seal in place, coupled with ease of installation characteristic of a wet injection seal.

DESCRIPTION OF THE DRAWINGS

The invention will be more clearly understood from the description below of a preferred embodiment, taken in conjunction with the accompanying drawing wherein.

DETAILED DESCRIPTION OF THE INVENTION AND PREFERRED EMBODIMENT

Figure 1:
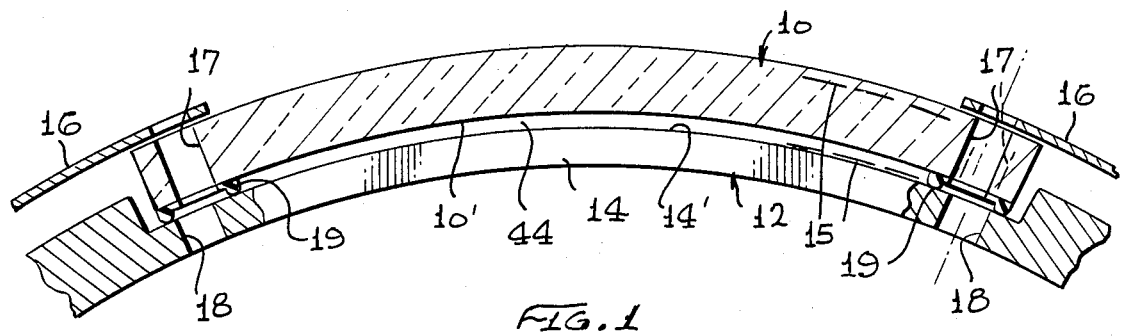
FIG. 1 is a cross-section of a prior art seal construction for an aircraft windshield mounted on a support member, showing a solid seal in its uncompressed condition between the curved windshield and the support member, with the bolt holes in such windshield and support member misaligned.

Referring to FIG. 1 of the drawing, there is illustrated the prior construction for providing a seal between a curved transparency or windshield, indicated at 10, and a support structure 12 comprising a curved base support member 14 having the same curvature as the windshield and curved upper support arms 16. The bolt holes 17 and 18 formed in the curved windshield and in the curved base support, respectively, and the axis thereof, are initially in substantial alignment when these curved members are positioned close to each other or essentially in contact with each other, as illustrated by the dotted lines 15 in FIG. 1. However, when the uncompressed solid elastomeric seals of the prior art, indicated at 19, in the form of a double bulb seal, are positioned between the curved windshield 10 and the curved support member 14, the curved contacting surfaces 10' and 14' of the windshield and support member are spaced apart a distance such that the bolt holes 17 and 18 of such members are out of alignment as seen in FIG. 1. This renders it difficult to install bolts into such misaligned holes until the seals 19 are compressed sufficiently to align the holes. Thus, only after the seals 19 are suitably compressed, can the bolts be installed and torqued. This makes it difficult to assemble the prior art seal construction of FIG. 1.

Figure 2:
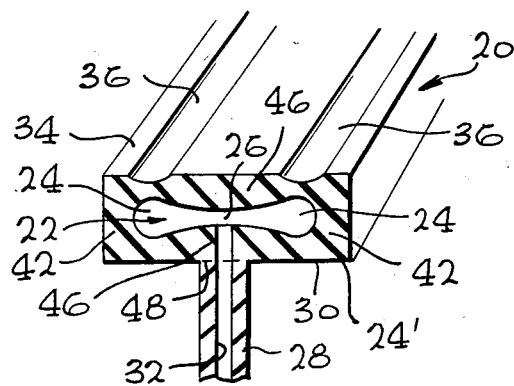
FIG. 2 is a perspective view, partly in section, of a flexible tube-like seal of hollow cross-section in its uncompressed state, employed in producing a seal according to the invention.

Referring to FIG 2 of the drawing, showing the seal employed in the invention device, numeral 20 is a tube-like or tubular flexible elastic seal or body member having a hollow cross-section 22 which is in the form of a pair of symmetrical bulb sections 24 interconnected by hollow neck 26. A feed tube 28 is integrally connected to the lower planar face 30 of the tubular body member 20, the inner passage 32 of the tube communicating with the hollow neck 26 of the hollow cross-section 22 of tubular member 20. The upper planar face 34 of the tubular body member 20 contains grooves 36 therein.

The hollow tube-like or tubular seal 20 is comprised of a flexible elastic material such as a silicone elastomer, natural or synthetic rubber, and the like.

Figure 4:
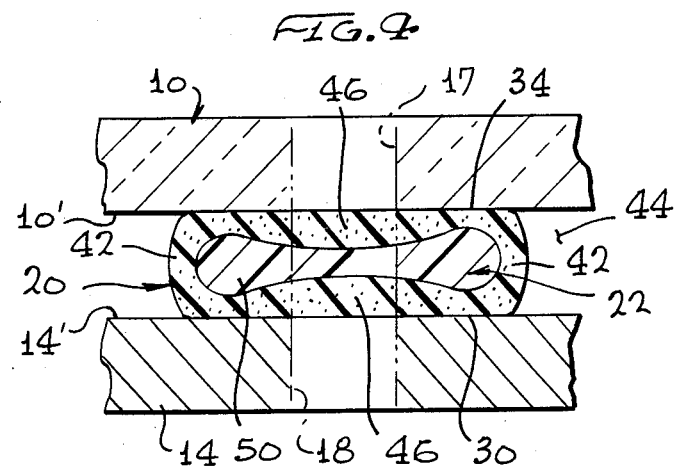
FIG. 4 is an enlarged cross-sectional view taken on the circle indicated at 4—4 in FIG. 3, showing the tube-like flexible seal of FIG. 2, following installation of the bolts, and injection and curing of the liquid resin to an elastomer in the hollow seal.
Figure 3:
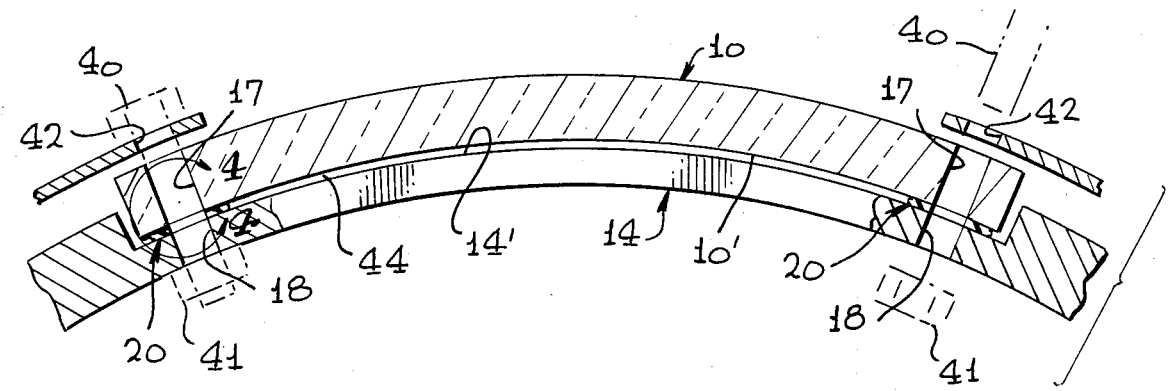
FIG. 3 is a view similar to FIG. 1, but showing a cross-section of the tube-like seal of the invention shown in FIG. 2, positioned between a curved transparency such as an aircraft windshield and a support member, the seal being shown in its initial uncompressed state, with the bolt holes in the windshield and the support member in alignment, and also showing the seal in its laterally stretched and compressed condition between the parts following insertion of the bolts and following injection of a curable liquid resin into the hollow cross-section of the seal and curing of the liquid resin to an elastomer.

According to the preferred practice of the invention, and referring to FIGS. 3 and 4 of the drawing, one or more tube-like flexible seals 20 as shown in FIG. 2, are positioned between the curved transparency 10 in the form of a windshield for an aircraft, and the curved base member 14. The spaced curved surfaces 10' and 14' of members 10 and 14 have substantially the same radius of curvature. The seal 20 in its relaxed state as illustrated at the right in FIG. 3, positions the adjacent curved surfaces 10' and 14' of members 10 and 14 sufficiently close together that the bolt holes 17 and 18 in such members are substantially in alignment. The cross-section of seal 20 in this relaxed state is equivalent in thickness to the conventional seal 19 in FIG. 1 when it its compressed condition.

With the bolt holes 17 and 18 in the curved transparency 10 and the base support 14 in proper alignment to receive the bolts, bolts 40 are then inserted through hole 42 of the support arm 16 and through the aligned holes 17 and 18, and are torqued as shown at the left in FIG. 3, the bolts 40 passing through seal body 20. The bolts 40 are suitably torqued by means of threaded nuts 41. The bolt holes 17 and 18 are in alignment when the seal body 20 is compressed by bolt tension.

A curable liquid resin is then injected through tube 28 into the hollow interior 22 of the tubular seal 20. Any type of liquid resin which cures to an elastomeric state can be employed. Such curable liquid resins can be a catalyzed resin which upon injection into the hollow cross-section 22 of the tubular body 20 cures either at elevated temperature or preferably at room temperature, in a relatively short period of time, to form a dry solid elastomeric resin. A preferred curable liquid resin which can be employed is a liquid silicone resin containing a suitable catalyst, as well known in the art, which is cured at room temperature over a period of about one to two hours. Other curable liquid resins which can be utilized include liquid polyurethane foam resins which contain a catalyst, e.g. dibutyltin dilaurate, and which also can contain foaming agents. The latter liquid resin foams and expands in the cavity 22 and polymerizes and cures at suitable temperature, e.g. at elevated temperature of about 160° F., for say about 15 to 20 minutes.

The curable liquid resin, preferably liquid silicone resin, is injected under pressure, e.g. 50 to 70 psi, through the tube 28 and into the cavity 22, causing the flexible seal body 20 to stretch laterally at the stretch zones 42 in the space 44 between the curved transparency 10 and the curved support 14, and causing the flexible seal body 20 to be compressed at the compression zones 46 outwardly into engagement with the surfaces 10' and 14' of the transparency 10 and the base support 14, respectively. As the liquid resin cures to an elastomeric state, the hydrostatic pressure of the curing resin in the cavity 22 in the seal body further stretches the seal body 20 laterally and also compresses the seal body against the adjacent surfaces 10' and 14' of members 10 and 14, respectively. After the liquid resin in the cavity 22 is fully cured to the elastomeric state, the feed tube 28 is trimmed off as indicated by dotted lines 48 in FIG. 2.

After curing of the liquid resin in cavity 22 to its dry elastomeric state, the resulting tubular seal 20 containing the cured dry solid elastomer 50 in the cavity 22, and which has been laterally stretched in the space 44 and compressed into contact with the adjacent part surfaces 10 and 14, is seen in FIG. 4. The energy stored in laterally stretching the tube-like body 20 and in compressing the tube surfaces 34 and 30 into contact with surfaces 10' and 14' of members 10 and 14, maintains the pressure required to effect the seal between the curved transparency 10 and the curved support 14. It will be noted that as a result of the compressive force of the surfaces 34 and 30 of the tubular seal 20 against the adjacent surfaces of the transparency 10 and 14, the grooves 36 in the upper surface 34 of the tubular seal 20 are flattened into the plane of the upper surface 10' of member 20, as seen in FIG. 4. The amount of sealing force which can be applied by the compressed seal 20 containing the cured elastomer 50 against surfaces 10' and 14', as a result of bolt tension, can be for example about 5 to about 10, e.g. 5, pounds per lineal inch.

When the curved transparency or windshield 10 requires repair, the bolts 40 can be loosened and removed readily to permit removal of the curved transparency 10 from the construction shown in FIG. 3, and following its repair the transparency can again be replaced in its position shown in FIG. 3, with another hollow seal 20 placed in proper position in the space 44, the bolts 40 inserted into the aligned bolt holes 17 and 18 and tightened, followed by injection of a curable liquid resin into the hollow cavity, and the resin cured, all as described above, to form the elastomeric seal. Thus, the construction of the invention, as illustrated in FIGS. 2 to 4, permits the ease of repair for the transparency 10 of a conventional dry seal such as the solid tubular seal of the prior art, as indicated in FIG. 1, and the ease of installation of a wet injection seal, according to the invention.

Although the seal construction of the invention has been described above particularly for effecting a dry seal between a curved transparency such as an aircraft windshield, and a support or support members, particularly to avoid misalignment of bolt holes for inserting bolts to attach the component parts together, such misalignment being caused when using the uncompressed dry seal of the prior art, the elastomer injection dry seal of the invention can be employed to produce a seal between any structural parts.

Further, although in the preferred embodiment of FIG. 3, the bolts 40 pass through the seal 20 of the invention so that sealing occurs in the area of the bolts, the bolts need not pass through the seal and the seal can be spaced from the bolts.

Since various changes and further modifications of the invention will occur to and can be made readily by those skilled in the art without departing from the invention concept, the invention is not to be taken as limited, except by the scope of the appended claims.

What is claimed is:

1. An elastomer injection dry seal positioned between a pair of spaced part surfaces of structural parts having holes therein and fastener means received in said holes to connect said structural parts, said seal produced by a process which comprises placing a tube-like flexible elastic body member having a hollow cross-section between spaced part surfaces of structural parts, to be sealed, said parts having holes therein across said part surfaces which are aligned when said elastic body member is placed therebetween, connecting said part surfaces by fastener means passing through said aligned holes, injecting a curable liquid resin under pressure into the hollow interior of said body member, causing said flexible body member to stretch laterally in the space between said surfaces and to be compressed into engagement with said surfaces, and curing said resin to an elastomeric state, the energy stored in stretching said body laterally and in compressing same into contact with said surfaces, effecting a seal therebetween.

2. The structure of claim 1, said elastic body member being a silicone elastomer, natural or synthetic rubber.

3. The structure of claim 1, said curable liquid resin being a catalyzed resin.

4. The structure of claim 3, said curable liquid resin being a liquid silicone resin injected at a pressure of about 50 to about 70 psi into the hollow interior of said body member.

5. The structure of claim 1, said parts comprising a curved transparent member and a curved supporting member for said transparent member.

6. The structure of claim 5, said curved transparent member being a curved aircraft windshield.

7. An elastomer injection dry seal positioned between a curved aircraft windshield and a curved supporting member for said windshield, and produced by a process which comprises placing at least one flexible elastic tubular seal having a hollow cross-section in its relaxed state between spaced surfaces of said windshield and said supporting member, said windshield and said supporting member having aligned holes therein which said tubular seal in relaxed state is positioned therebetween, connecting said windshield and said supporting member by means of bolts passing through said aligned holes of said windshield and said supporting member, and also passing through said tubular seal, injecting liquid silicone resin at a pressure of about 50 to 70 psi into the hollow interior of said at least one tubular seal, causing said flexible tubular seal to stretch laterally in the space between the adjacent surfaces of said windshield and said supporting member, and to be compressed into engagement with said surfaces, and curing said resin to an elastomeric state, the energy stored in stretching said tubular seal and in compressing same into contact with said surfaces, effecting a seal therebetween.

8. A process for installing an elastomer injection dry seal between the surfaces of spaced parts having fastener holes therein, which comprises placing a tube-like flexible elastic body member having a hollow cross-section between spaced part surfaces of structural parts to be sealed, said parts having holes therein across said part surfaces which are aligned when said elastic body member is placed therebetween, connecting said part surfaces by fastener means passing through said aligned holes, injecting a curable liquid resin under pressure into the hollow interior of said body member, causing said flexible body member to stretch laterally in the space between said surfaces and to be compressed into engagement with said surfaces, against restraining opposing forces exerted by said parts, and curing said resin to an elastomeric state, the energy stored in stretching said body laterally and in compressing same into contact with said surfaces, effecting a seal therebetween.

9. The process of claim 8, said elastic body member being a silicone elastomer, natural or synthetic rubber, said curable liquid resin being a catalyzed resin.

10. The process of claim 8, said curable liquid resin being a liquid silicone resin injected at a pressure of about 50 to 70 psi into the hollow interior of said body member.

11. The process of claim 8, said parts comprising a curved transparent member and a curved supporting member.

12. The process of claim 11, said curved transparent member being a curved aircraft windshield, said fastener means connecting said windshield and said supporting member.

13. The process of forming an elastomer injection dry seal between a curved aircraft windshield and a curved supporting member, which comprises placing a flexible elastic tubular member having a hollow cross-section in its relaxed state between spaced surfaces of said windshield and said supporting member, said windshield and said supporting member having aligned holes therein when said tubular member in relaxed state is positioned therebetween, connecting said windshield and said supporting member by means of bolts passing through said aligned holes in said windshield and said supporting member, injecting liquid silicone resin at a pressure of about 50 to 70 psi into the hollow interior of said tubular member, causing said flexible tubular member to stretch laterally in the space between the adjacent surfaces of said windshield and said supporting member, against restraining opposing forces exerted by said windshield and said supporting member, and to be compressed into engagement with said surfaces, and curing said resin to an elastomeric state, the energy stored in stretching said tubular member and in compressing same into contact with said surfaces, effecting a seal therebetween.

* * * * *